(12) United States Patent
Nahidi et al.

(10) Patent No.: US 11,491,970 B2
(45) Date of Patent: Nov. 8, 2022

(54) ARCHITECTURE AND METHODOLOGY FOR INTEGRATED WHEEL AND BODY DYNAMIC CONTROLS WITH STANDARD STABILITY FEATURES

(71) Applicant: GM GLOBAL TECHNOLOGY OPERATIONS LLC, Detroit, MI (US)

(72) Inventors: Seyedeh Asal Nahidi, North York (CA); SeyedAlireza Kasaiezadeh Mahabadi, Novi, MI (US); James H. Holbrook, Fenton, MI (US); Hualin Tan, Novi, MI (US); Bakhtiar B. Litkouhi, Washington, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 368 days.

(21) Appl. No.: 16/787,698

(22) Filed: Feb. 11, 2020

(65) Prior Publication Data

US 2021/0245732 A1    Aug. 12, 2021

(51) Int. Cl.
| | |
|---|---|
| *B60W 30/02* | (2012.01) |
| *B60K 17/02* | (2006.01) |
| *B60K 17/16* | (2006.01) |
| *B60W 10/08* | (2006.01) |
| *B60W 10/02* | (2006.01) |
| *B60K 17/22* | (2006.01) |
| *B60W 10/30* | (2006.01) |

(52) U.S. Cl.
CPC ............ *B60W 30/02* (2013.01); *B60K 17/02* (2013.01); *B60K 17/16* (2013.01); *B60K 17/22* (2013.01); *B60W 10/02* (2013.01); *B60W 10/08* (2013.01); *B60W 10/30* (2013.01)

(58) Field of Classification Search
CPC ...... B60W 30/02; B60W 10/02; B60W 10/08; B60W 10/30; B60K 17/02; B60K 17/16; B60K 17/22
See application file for complete search history.

(56) References Cited

FOREIGN PATENT DOCUMENTS

| CN | 101288081 A | * | 10/2008 | ............ B60T 8/1755 |
|---|---|---|---|---|
| CN | 105599637 A | * | 5/2016 | ............. B60L 15/20 |
| DE | 10050420 A1 | * | 3/2003 | ......... B60G 17/0195 |
| EP | 1234741 A2 | * | 8/2002 | .......... B60T 8/17554 |
| KR | 20180060734 A | * | 6/2018 | ............ B60W 30/02 |
| WO | WO-2008092003 A2 | * | 7/2008 | ......... B60G 17/0165 |

* cited by examiner

*Primary Examiner* — Tisha D Lewis
(74) *Attorney, Agent, or Firm* — Quinn IP Law

(57) ABSTRACT

A method of controlling stability of a vehicle and a stability control system for the vehicle. A driver command is determined based on driver input data. At least one output command is sent to one or more vehicle systems to control stability of the vehicle based on the driver command. A controller sends the output command based on a control hierarchy that provides an order in which the controller controls body motion of the vehicle, wheel slip of the vehicle, and standard stability of the vehicle to control stability of the vehicle. The order dictates that the controller controls the body motion of the vehicle and the wheel slip of the vehicle before the controller controls the standard stability of the vehicle. A state of one or more of the vehicle systems is controlled based on the sent output command as dictated via the control hierarchy.

20 Claims, 3 Drawing Sheets

ARCHITECTURE AND METHODOLOGY FOR INTEGRATED WHEEL AND BODY DYNAMIC CONTROLS WITH STANDARD STABILITY FEATURES

INTRODUCTION

Vehicles have been designed with different drive systems. For example, some vehicle drive systems may be rear-wheel drive, front-wheel drive or all-wheel drive (AWD). Depending on the drive system configuration, the vehicle may have a tendency to move a certain way during steering of the vehicle along a road. For example, as an AWD vehicle travels along a curve of a road, axle torque may cause understeering of the vehicle or oversteering of the vehicle.

SUMMARY

The present disclosure provides a method of controlling stability of a vehicle. Driver input data is collected via a controller. A driver command is determined based on the driver input data. At least one output command is sent, via the controller, to one or more vehicle systems to control stability of the vehicle based on the driver command. The controller sends the output command based on a control hierarchy that provides an order in which the controller controls body motion of the vehicle, wheel slip of the vehicle, and standard stability of the vehicle to control stability of the vehicle. The order dictates that the controller controls the body motion of the vehicle and the wheel slip of the vehicle before the controller controls the standard stability of the vehicle. A state of one or more of the vehicle systems is controlled based on the sent output command as dictated via the control hierarchy.

In one aspect, the control hierarchy further includes that the order dictates that the controller controls the body motion of the vehicle first, and if one or more wheels of the vehicle indicates an unstable behavior, then the controller controls the wheel slip of the vehicle, and then if the body motion and the wheels do not behave as requested, then the controller controls the standard stability of the vehicle.

In another aspect, the control hierarchy further includes that the order dictates that the controller controls the body motion and the wheel slip together, and if the body motion and one or more wheels of the vehicle do not behave as requested, then the controller controls the standard stability of the vehicle.

In one aspect, the vehicle systems include a plurality of actuators. The output command is sent to at least one of the actuators of one or more of the vehicle systems to control the body motion of the vehicle and the wheel slip of the vehicle. Therefore, in certain configurations, the state of one or more of the actuators is controlled based on the output command. Furthermore, in certain configurations, the actuators include an electric motor, a clutch, an electronic limited slip differential (eLSD), an active aerodynamic assembly, and an engine/axle torque actuator, and the at least one of the electric motor, the clutch, the eLSD, the active aerodynamic assembly, and the engine/axle torque actuator is selectively actuated to control the state.

In another aspect, a front axle and a rear axle is spaced from each other. The eLSD is selectively actuated to control distribution of torque laterally of the respective front axle and the respective rear axle to control the wheel slip.

In yet another aspect, at least one of the actuators is coupled to one of the front and rear axles. The at least one of the actuators that is coupled to one of the front axle and the rear axle is selectively actuated to control front-to-rear axle torque.

In another aspect, the eLSD is coupled to the other one of the front axle and the rear axle. The eLSD is selectively actuated to control distribution of torque laterally of the respective front axle and the respective rear axle to control the wheel slip.

In yet another aspect, one of the actuators is coupled to the front axle to control the axle torque of the front axle, and another one of the actuators is coupled to the rear axle to control front-to-rear axle torque. The actuator coupled to the front axle is selectively actuated and the actuator coupled to the rear axle is selectively actuated.

In one aspect, the eLSD is coupled to one of the front axle and the rear axle. The eLSD is selectively actuated to control distribution of torque laterally of the respective front axle and the respective rear axle to control the wheel slip.

In another aspect, the driver input data includes an amount of acceleration of the vehicle via an accelerator, a steering angle of the vehicle via a steering input, a speed of the vehicle along a longitudinal axis, and an amount of braking of the vehicle via a brake. The driver command is determined based on the amount of acceleration, the steering angle, the speed of the vehicle, and the amount of braking.

In yet another aspect, the vehicle systems include a traction control system, an anti-lock brake system, and an electronic stability control system which are the vehicle systems controlled in the standard stability of the vehicle.

In yet another aspect, a target body motion is calculated, via the controller, based on a lateral velocity of the vehicle at a center of gravity point, a yaw rate of the vehicle at the center of gravity point, and a total yaw moment of the vehicle at the center of gravity point. The output command is sent based on the target body motion to control the body motion of the vehicle.

In yet another aspect, a target wheel motion is calculated, via the controller, based on a moment of inertia of a wheel, a driving torque of the wheel, and a braking torque of the wheel. The output command is sent based on the target wheel motion to control the wheel slip of the vehicle.

The present disclosure also provides a stability control system for a vehicle that includes a front axle and a rear axle spaced from the front axle. A first set of wheels is coupled to the front axle, and a second set of wheels is coupled to the rear axle. A controller includes a processor configured to execute instructions from a memory. The controller is configured to collect driver input data, and determine a driver command based on the driver input data. The controller is also configured to send at least one output command to one or more vehicle systems to control stability of the vehicle based on the driver command. The controller sends the output command based on a control hierarchy that provides an order in which the controller controls body motion of the vehicle, wheel slip of one or more of the first and second sets of the wheels of the vehicle, and standard stability of the vehicle to control stability of the vehicle. The order dictates that the controller controls the body motion of the vehicle and the wheel slip of the vehicle before the controller controls the standard stability of the vehicle. The controller is also configured to control a state of one or more of the vehicle systems based on the sent output command as dictated via the control hierarchy.

In one aspect, the control hierarchy further includes that the order dictates that the controller controls the body motion of the vehicle first, and if one or more wheels of the vehicle indicates an unstable behavior, then the controller controls the wheel slip of the vehicle, and then if the body motion and the wheels do not behave as requested, then the controller controls the standard stability of the vehicle.

In another aspect, the control hierarchy further includes that the order dictates that the controller controls the body motion and the wheel slip together, and if the body motion and one or more wheels of the vehicle do not behave as requested, then the controller controls the standard stability of the vehicle.

In one aspect, the vehicle systems include a plurality of actuators, and at least one of the actuators is coupled to one of the front and rear axles. The controller is configured to selectively actuate at least one of the actuators that is coupled to one of the front axle and the rear axle to control front-to-rear axle torque.

In another aspect, one of the actuators include an electronic limited slip differential (eLSD) that is coupled to the other one of the front axle and the rear axle. The controller is configured to selectively actuate the eLSD to control distribution of torque laterally of the respective front axle and the respective rear axle to control the wheel slip of one or more of the first and second sets of the wheels of the vehicle.

In yet another aspect, the controller is configured to calculate a target body motion based on a lateral velocity of the vehicle at a center of gravity point, a yaw rate of the vehicle at the center of gravity point, and a total yaw moment of the vehicle at the center of gravity point. The controller is configured to send the output command based on the target body motion to control the body motion of the vehicle.

In yet another aspect, the controller is configured to calculate a target wheel motion based on a moment of inertia of a wheel, a driving torque of the wheel, and a braking torque of the wheel. The controller is configured to send the output command based on the target wheel motion to control the wheel slip of one or more of the first and second sets of the wheels of the vehicle.

In yet another aspect, the driver input data includes an amount of acceleration of the vehicle via an accelerator, a steering angle of the vehicle via a steering input, a speed of the vehicle along a longitudinal axis, and an amount of braking of the vehicle via a brake. The controller is configured to determine the driver command, which includes, in certain configurations, determining the driver command based on the amount of acceleration, the steering angle, the speed of the vehicle, and the amount of braking.

In yet another aspect, the vehicle systems include a traction control system, an anti-lock brake system, and an electronic stability control system which are the vehicle systems controlled in the standard stability of the vehicle.

The detailed description and the drawings or figures are supportive and descriptive of the disclosure, but the claim scope of the disclosure is defined solely by the claims. While some of the best modes and other configurations for carrying out the claims have been described in detail, various alternative designs and configurations exist for practicing the disclosure defined in the appended claims.

DETAILED DESCRIPTION

Those having ordinary skill in the art will recognize that all directional references (e.g., above, below, upward, up, downward, down, top, bottom, left, right, vertical, horizontal, etc.) are used descriptively for the figures to aid the reader's understanding, and do not represent limitations (for example, to the position, orientation, or use, etc.) on the scope of the disclosure, as defined by the appended claims.

Figure 1:
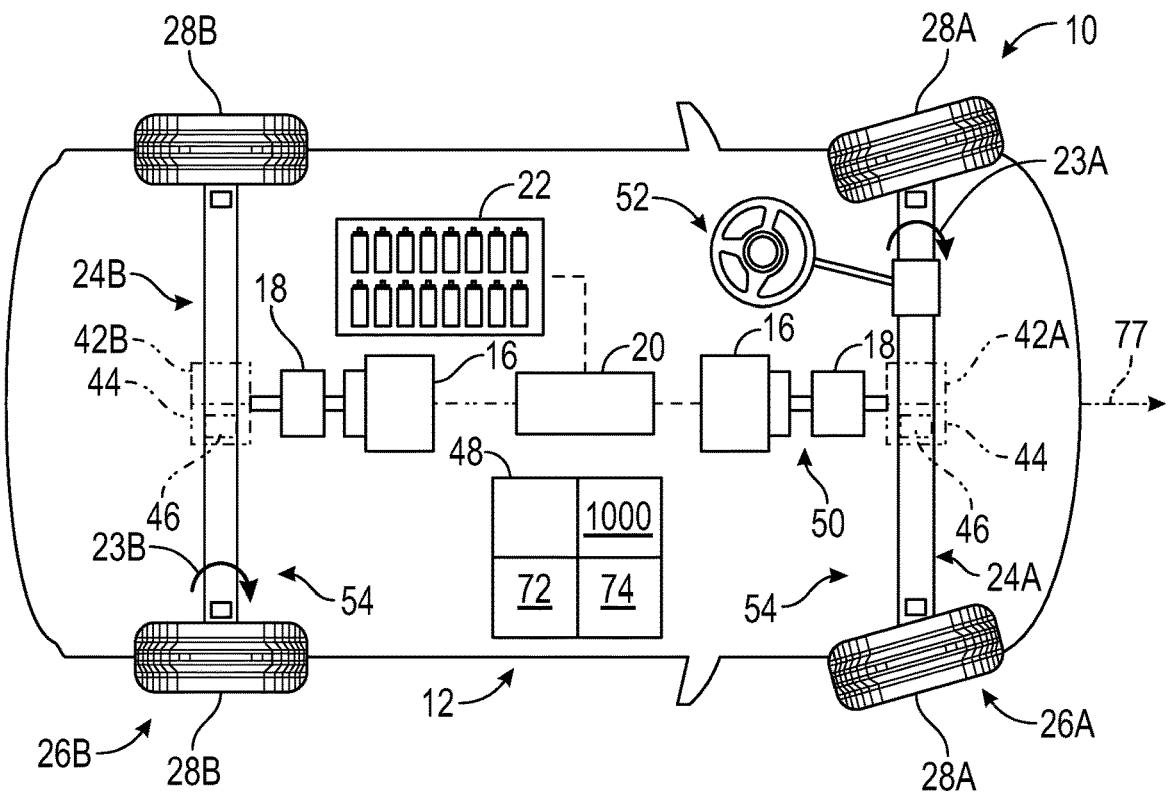
FIG. 1 is a schematic illustration of a vehicle.

Referring to the FIGS., wherein like numerals indicate like or corresponding parts throughout the several views, a movable platform, such as a vehicle 10 is generally shown in FIG. 1. A stability control system 12, and corresponding method 1000, may be implemented into the vehicle 10 to improve stability and handling of the vehicle 10 as the vehicle 10 travels along a road 14. The stability control system 12 and the method 1000 enhance body dynamic control and without the loss of wheel dynamic controls during various handling maneuvers. The body and wheel dynamic controls are coordinated with standard control features, which will be further discussed below.

Non-limiting examples of the vehicle 10 may include a car, a truck, a motorcycle, an off-road vehicle, a farm vehicle, a watercraft, an aircraft, rail vehicles, or any other suitable movable platform. Additionally, the vehicle 10 may be a hybrid vehicle, an electric vehicle, a gas-powered or a diesel-powered vehicle, or any other vehicle that is movable, etc. It is to be appreciated that alternatively, a non-vehicle application may be used, such as, farm equipment, robots, conveyors, transport platforms, etc. For illustrative purposes, the movable platform of FIG. 1 will be described hereinafter in the context of a vehicle 10 without limiting the present teachings to vehicle applications in general.

Continuing with FIG. 1, the vehicle 10 may include an engine 16 and a transmission 18 coupled to the engine 16. Any suitable engine 16 may be utilized, and non-limiting examples may include an internal combustion engine, one or more electric motor(s), etc., and combinations thereof. Generally, the transmission 18 is coupled to the engine 16 to receive torque outputted from the engine 16. FIG. 1 is illustrative of the ability of having two electric motors, in which each of the electric motors are electrically connected to a power inverter 20, and the ability of having a different option in which one electric motor electrically connected to the power inverter 20 and a separate internal combustion engine which is not electrically connected to the power inverter 20. The phantom lines (dash-dot-dot-dash lines) between the power inverter 20 and one of boxes labeled number 16 indicates the optional electric connection depending on the type of engine 16 being used. The power inverter 20 is in electrical communication with a power source 22, such as one or more batteries, etc.

The engine 16 may include an output shaft, and the transmission 18 may include an input member. The output shaft of the engine 16 rotates at an engine speed, and torque from rotation of the output shaft is transferred to the input member of the transmission 18, which causes the input member to rotate. The powertrain of the vehicle 10 may include one or more electric traction motors in an optional hybrid configuration to provide additional sources of input torque. Non-limiting examples of the transmission 18 may include automatic transmission, dual clutch transmission, automated manual transmission, continuously variable transmission (CVT), etc.

The transmission 18 may include a final drive coupled to the input member of the transmission 18 and an output member that delivers output torque 23A, 23B to one or more drive axles 24A, 24B through the final drive, and ultimately to a set of wheels that each have respective tires 28A, 28B that engage the road 14. Generally, the stability control system 12 of the vehicle 10 may include a front axle 24A and a rear axle 24B spaced from the front axle 24A; and one or both of the front axle 24A and the rear axle 24B may be the drive axles. A first set of wheels 26A may be coupled to the front axle 24A and a second set of wheels 26B may be coupled to the rear axle 24B.

Torque from the engine 16 is transferred to the transmission 18, and the transmission 18 outputs torque 23A, 23B to drive one or more of the wheels 26A, 26B. It is to be appreciated that the final drive may be driven by an endless rotatable member, and non-limiting examples of the endless rotatable member may include a belt or a chain.

In certain configurations, the vehicle 10 may be a front-wheel drive vehicle in which the torque 23A is delivered to a front axle 24A to drive front wheels 26A of the vehicle 10. In other configurations, the vehicle 10 may be a rear-wheel drive vehicle in which the torque 23B is delivered to a rear axle 24B to drive rear wheels 26B of the vehicle 10. In yet other configurations, the vehicle 10 may be an all-wheel drive (AWD) vehicle in which the torque 23A, 23B is delivered to the front axle 24A and the rear axle 24B to drive the respective front wheels 26A and the respective rear wheels 26B of the vehicle 10. Torque 23A, 23B may also be referred to as axle torque 23A, 23B herein.

Figure 2:
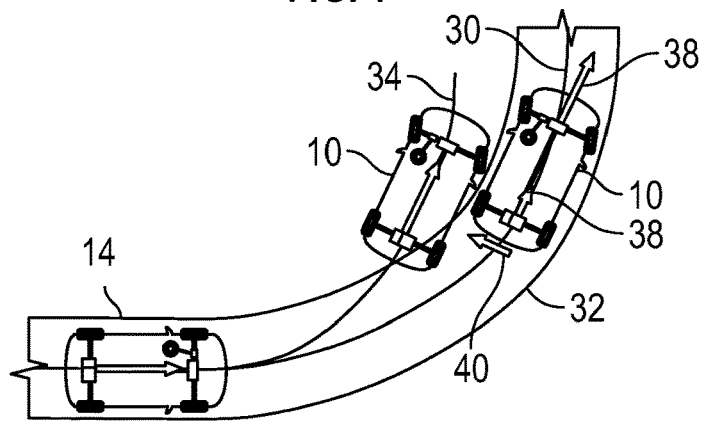
FIG. 2 is a schematic illustration of the vehicle traveling along a road in a desired path and an oversteering path.
Figure 3:
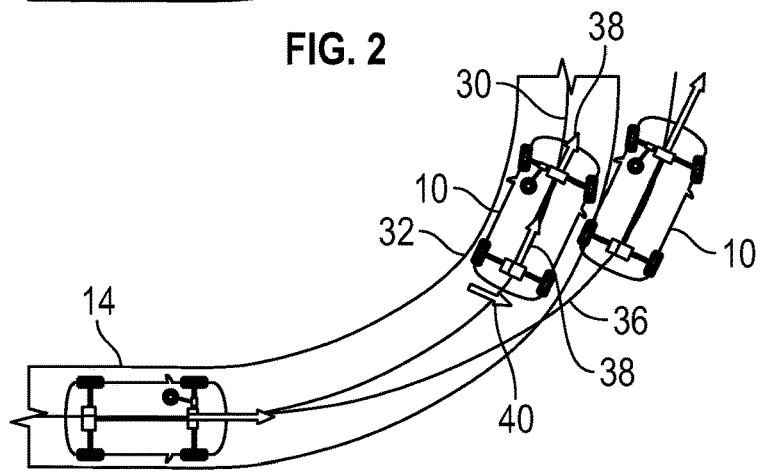
FIG. 3 is a schematic illustration of the vehicle traveling along the road in the desired path and an understeering path.

Referring to FIGS. 2 and 3, when the vehicle 10 travels along the road 14, it is desirable to maintain the vehicle 10 along a desired path 30. As the vehicle 10 travels through a curve 32 in the road 14, it is desirable to minimize oversteering (see FIG. 2, oversteering path 34) and understeering (see FIG. 3, understeering path 36) of the vehicle 10 through the curve 32. Oversteering of the vehicle 10 is when the vehicle 10 travels through the curve sharper than the desired path 30. Generally, oversteering occurs when too much of the torque 23B is transferred to the rear tires 28B when the vehicle 10 travels around the curve 32. Understeering of the vehicle 10 is when the vehicle 10 travels through the curve straighter than the desired path 30. Generally, understeering occurs when too much of the torque 23A is transferred to the front tires 28A as the vehicle 10 travels around the curve 32.

Various mechanisms may be utilized to minimize oversteering and understeering of the vehicle 10, as well as improve stability and handling of the vehicle 10. For example, controlling the torque 23A, 23B to the wheels 26A, 26B may improve stability and handling, and minimize oversteering and understeering. The torque 23A, 23B to the wheels 26A, 26B may be controlled linearly (linearly examples are shown via arrows 38) and/or laterally (laterally examples shown via arrow 40), which may be referred to as torque split. With regard to linearly, front-rear torque split may include front axle 24A to rear axle 24B, or rear axle 24B to front axle 24A. With regard to laterally, the torque 23A, 23B may be controlled side to side relative to the front axle 24A or the torque 23A, 23B may be controlled side to side relative to the rear axle 24B. For illustrative purposes, side to side may include left to right, or right to left, and may generally be referred to as left-right torque split herein.

Turning back to FIG. 1, one way for controlling the torque 23A, 23B is utilizing one or more actuators 42A, 42B. Therefore, for example, the stability control system 12 may include a first actuator 42A coupled to one of the front axle 24A and the rear axle 24B. The first actuator 42A may control the torque 23A, 23B linearly. As such, the first actuator 42A may control front-rear torque split. The first actuator 42A may be used to assist with body dynamic controls. In certain configurations, the first actuator 42A is coupled to the front axle 24A. The first actuator 42A may be an electric motor 64 or any other suitable type of actuator to control the torque 23A.

In certain configurations, the stability control system 12 may include a second actuator 42B coupled to the other one of the front axle 24A and the rear axle 24B. The second actuator 42B may control the torque 23A, 23B linearly. As such, the second actuator 42B may control front-rear torque split. When the vehicle 10 includes both the first and second actuators 42A, 42B, the first actuator 42A may be coupled to the front axle 24A and the second actuator 42B may be coupled to the rear axle 24B. The second actuator 42B may be used to assist with body dynamic controls. The second actuator 42B may be an electric motor 64 or any other suitable type of actuator to control the torque 23B.

Additionally, the stability control system may include an electronic limited slip differential (eLSD) 44 coupled to one of the front axle 24A and the rear axle 24B. Generally, the eLSD 44 functions to allow the wheels 26A, 26B and corresponding tires 28A, 28B of one of the axles 24A, 24B to rotate at different speeds while limiting the amount of the torque 23A, 23B delivered to each of the wheels 26A, 26B and corresponding tires 28A, 28B of that axle 24A, 24B. The eLSD 44 may assist with body dynamic controls as well as wheel dynamic controls.

In certain configurations, the first actuator 42A may be coupled to the front axle 24A and the eLSD 44 may be coupled to the rear axle 24B. In other configurations, the first actuator 42A may be coupled to the rear axle 24B and the eLSD 44 may be coupled to the front axle 24A. In yet other configurations, the first actuator 42A may be coupled to the front axle 24A and the second actuator 42B may be coupled to the rear axle 24B and the eLSD 44 may also be coupled to one of the axles 24A, 24B. Therefore, in certain configurations, the eLSD 44 may be coupled to the same axle 24A, 24B as one of the actuators 42A, 42B. FIG. 1 illustrates the first actuator 42A, the second actuator 42B and the eLSD 44 in phantom lines in light of the different location variations discussed immediately above.

Regardless of which of the axles 24A, 24B the eLSD 44 is coupled to, the eLSD 44 controls the torque 23A, 23B laterally. As such, the eLSD 44 may control left-right torque split. Generally, if the eLSD 44 is coupled to the front axle 24A, depending on which of the tires 28A of the front axle 24A has a higher velocity as the vehicle 10 travels along the curve 32, the torque 23A, 23B is transferred from the higher velocity tire to the lower velocity tire. Similarly, if the eLSD 44 is coupled to the rear axle 24B, depending on which of the tires 28B of the rear axle 24B has a higher velocity as the vehicle 10 travels along the curve 32, the torque 23A, 23B is transferred from the higher velocity tire to the lower velocity tire.

The eLSD 44 may include a clutch 46 that is configured to selectively engage to transfer the torque 23A, 23B to the wheel 26A, 26B of the corresponding tire 28A, 28B that is rotating slower than the other wheel 26A, 26B of the corresponding tire 28A, 28B of either the front axle 24A or the rear axle 24B. As such, wheel slip may be controlled with the eLSD 44. It is to be appreciated that the eLSD 44 may include other components, which are not discussed herein.

The present disclosure provides the method 1000 of controlling stability of the vehicle 10. The method 1000 discussed herein may use a predictive model 2000 or any suitable multiple-input-multiple-output (MIMO) model to enhance stability and handling of the vehicle 10. For illustrative purposes, the predictive model 2000 is referred to below. The method and the predictive model 2000 may improve body behavior of the vehicle 10, such as yaw tracking, and wheel behavior of the vehicle 10, to satisfy the driver's desired path 30 of the vehicle 10.

Figure 4:
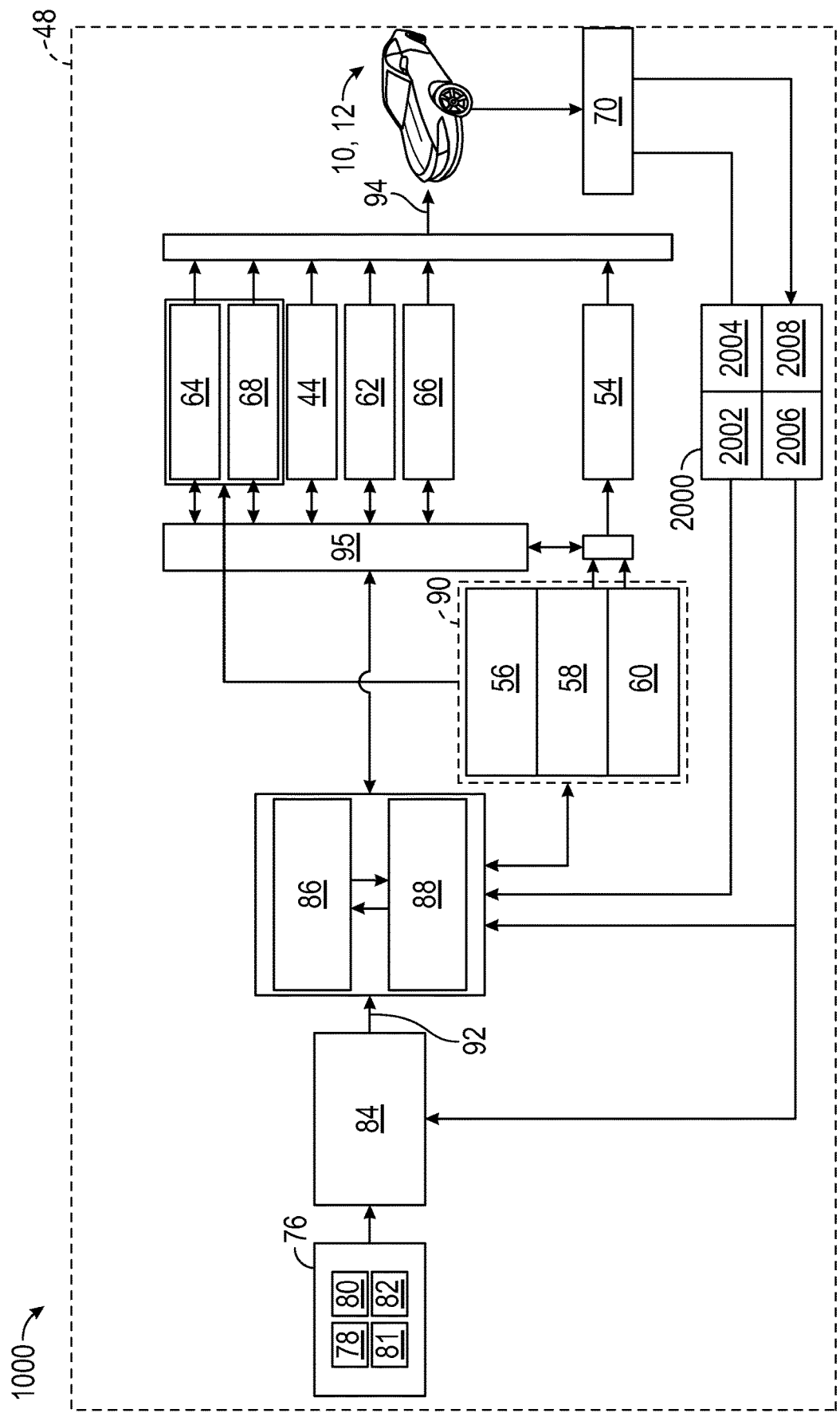
FIG. 4 is a schematic illustration of method of controlling stability of the vehicle.

Referring to FIGS. 1 and 4, a controller 48 may be utilized to communicate with and/or control various components and systems of the vehicle 10. For example, the controller 48 may be in communication with various vehicle systems, and non-limiting examples of some of the components and the vehicle systems may include the stability control system 12; the engine 16; a throttle system 50; a steering system 52; a braking system 54; a traction control system (TCS) 56; an anti-lock brake system (ABS) 58; an electronic stability control system (ESC) 60; the eLSD 44; one or more actuators, such as the first actuator 42A (which may be an electric motor 64), the second actuator 42B (which may be an electric motor 64), the clutch 46 of the eLSD 44, other clutches, a dual clutch 62, one or more electric motors 64, an active aerodynamic assembly 66, and an engine/axle torque actuator 68, etc.; and one or more sensors 70, etc., some of which are discussed below. The active aerodynamic assembly may include a spoiler, a wing, a splitter, or a flap, etc., that is exposed outside of the vehicle 10, and the spoiler is adjustable via one of the actuators, such as one of the electric motors 64, to change a downforce on the vehicle 10. The engine/axle torque actuator 68 may be used to change driving torques for each of the front and rear axles 24A, 24B. Generally, the dual clutch 62 may be used to control body behavior of the vehicle 10 by being configured to transfer torque laterally, bi-directionally, between the respective wheels 26A, 26B, as compared to the eLSD 44 which transfers torque from the higher velocity wheel 26A, 26B to the lower velocity wheel 26A, 26B relative to the respective front and rear axles 24A, 24B.

The controller 48 may collect data regarding actuation of the actuators 42A, 42B, 44, 46, 62, 64, 66, 68. The controller 48 may use the data collected from the vehicle systems 12, 16, 18, 50, 52, 54, 56, 58, 60, the actuators 42A, 42B, 44, 46, 62, 64, 66, 68, the sensors 70, or other data to control stability and handling of the vehicle 10 along the road 14, such as a curve 32. The controller 48 may include a processor 72 configured to execute instructions from a memory 74. Therefore, instructions may be stored in the memory 74 of the controller 48 and automatically executed via the processor 72 of the controller 48 to provide the respective control. The predictive model 2000 is stored in the memory 74 of the controller 48.

The controller 48 is configured to execute the instructions from the memory 74, via the processor 72. For example, the controller 48 may be a host machine or distributed system, e.g., a computer such as a digital computer or microcomputer, and, as the memory 74, tangible, non-transitory computer-readable memory such as read-only memory (ROM) or flash memory. The controller 48 may also have as memory 74, random access memory (RAM), electrically erasable programmable read-only memory (EEPROM), a high-speed clock, analog-to-digital (A/D) and/or digital-to-analog (D/A) circuitry, and any required input/output circuitry and associated devices, as well as any required signal conditioning and/or signal buffering circuitry. Therefore, the controller 48 may include all software, hardware, memory 74, algorithms, connections, sensors 70, etc., necessary to control, for example, various components of the vehicle 10 when using the predictive model 2000. As such, a control method 1000 operative to control the vehicle systems 12, 16, 18, 50, 52, 54, 56, 58, 60 and the actuators 42A, 42B, 44, 46, 62, 64, 66, 68, may be embodied as software or firmware associated with the controller 48. It is to be appreciated that the controller 48 may also include any device capable of analyzing data from various sensors 70, comparing data, making the necessary decisions required to control and/or monitor the various components and systems of the vehicle 10. Optionally, more than one controller 48 may be utilized.

Referring to FIG. 4, driver input data 76 is collected via the controller 48. Generally, the driver input data 76 is the data collected in response to the driver directing the vehicle 10 along the road 14. Therefore, the driver input data 76 may include data from the throttle system 50 which corresponds to the acceleration of the vehicle 10, the steering system 52 which corresponds to the steering of the vehicle 10, data from a speed that the vehicle 10 is traveling along a longitudinal axis 77 (which may also be referred to as longitudinal speed or velocity of the vehicle 10), and the braking system 54 which corresponds to the braking or slowing down of the vehicle 10. For example, the driver input data 76 may include an amount of acceleration of the vehicle 10 via an accelerator 78, a steering angle ($\delta$) of the vehicle 10 via a steering input 80, the speed of the vehicle 10 along the longitudinal axis 77 identified via a sensor 81, and an amount of braking of the vehicle 10 via a brake 82. The driver may engage the accelerator 78 to change the amount of acceleration that propels the vehicle 10, which changes the amount of torque outputted from the engine 16. The driver may steer the vehicle 10 via the steering input 80, such as a steering wheel, a joystick, etc., to change the direction of the vehicle 10, i.e., the steering angle. The driver may engage the brake 82 to slow down or stop the vehicle 10.

Continuing with FIG. 4, a driver command 84 is determined based on the driver input data 76. In certain configurations, the driver command 84 is determined based on the amount of acceleration, the steering angle, the speed of the vehicle 10 (along the longitudinal axis 77), and the amount of braking. The driver command 84 may be referred to as a driver command interpreter (DCI).

The driver command 84 is used, via the controller 48, to achieve a desired stability and handling of the vehicle 10. That is, the driver has requested the vehicle 10 perform in a certain way, and the controller 48 uses the various vehicle systems 12, 16, 18, 50, 52, 54, 56, 58, 60 to achieve the desired request. It is desirable to control body dynamics, e.g., body motion 86 of the vehicle 10 as well as wheel dynamics, e.g., wheel slip 88 of the vehicle 10, to improve stability and handling of the vehicle 10. It is also desirable to provide standard stability 90 of the vehicle 10 which may be stability and handling features regulated and mandated via an authority or an organization. One or more controllers 48 may be used to control the body motion 86, the wheel slip 88, and the standard stability 90. For example, one controller may be used to control the body motion 86, another controller may be used to control the wheel slip 88, and yet another controller may be used to control the standard stability 90. As another example, one controller may be used to control more than one of the body motion 86, the wheel slip 88, and the standard stability 90. Therefore, in certain configurations, the (main) controller 48 may be in communication with one or more other (secondary) controllers.

The body motion 86 of the vehicle 10 may generally refer to body behavior, such as yaw rate, yaw moment, lateral velocity, etc. For example, the body motion 86 of the vehicle 10 may use the actuators 42A, 42B, 44, 46, 62, 64, 66, 68 that control front-rear torque split. The wheel slip 88 of the vehicle 10 may generally refer to wheel behavior, such as slip of one or more of the wheels 26A, 26B, movement of the front and/or rear axles 24A, 24B, etc. For example, the wheel slip 88 of the vehicle 10 may use the actuators 42A, 42B, 44, 46, 62, 64, 66, 68 that control left-right torque split. In certain configurations, the actuators 42A, 42B, 44, 46, 62, 64, 66, 68 that are used to control the body motion 86 may be the same as the actuators 42A, 42B, 44, 46, 62, 64, 66, 68 that are used to control the wheel slip 88.

The vehicle systems 12, 16, 18, 50, 52, 54, 56, 58, 60 that are controlled in the standard stability 90 of the vehicle 10 may generally include the TCS 56, the ABS 58, and the ESC 60. Generally, when having to implement the TCS 56, the ABS 58, and/or the ESC 60, energy is wasted, and the stability control system 12 and the method 1000 herein are used to avoid wasting energy as much as possible.

At least one output command 92 is sent, via the controller 48, to one or more of the vehicle systems 12, 16, 18, 50, 52, 54, 56, 58, 60 to control stability of the vehicle 10 based on the driver command 84. Therefore, the data or information collected via the controller 48 regarding various vehicle systems 12, 16, 18, 50, 52, 54, 56, 58, 60 are used to determine one or more output commands 92 to control the stability and handling of the vehicle 10 in order to satisfy the driver's requested vehicle performance.

The controller 48 sends the output command 92 based on a control hierarchy that provides an order in which the controller 48 controls the body motion 86 of the vehicle 10, the wheel slip 88 (of one or more of the first and second sets of wheels 26A, 26B) of the vehicle 10, and the standard stability 90 of the vehicle 10 to control stability of the vehicle 10. This control hierarchy provides the desired stability and handling of the vehicle 10 while also saving energy by delaying or postponing the intervention of the standard stability 90 features of the vehicle 10.

Generally, the order dictates that the controller 48 controls the body motion 86 of the vehicle 10 and the wheel slip 88 of the vehicle 10 before the controller 48 controls the standard stability 90 of the vehicle 10. Therefore, standard stability 90 of the vehicle 10 is controlled last. The controller 48 controls the body motion 86 and the wheel slip 88 to redistribute various forces being applied to the body and the wheels 26A, 26B before looking to implement the standard stability 90 features of the vehicle 10. By delaying or postponing the controls to the standard stability 90 of the vehicle 10, energy may be saved because the vehicle systems 12, 16, 18, 50, 52, 54, 56, 58, 60 directed to the standard stability 90 may be implemented less or not at all.

In certain configurations, the control hierarchy provides that the controller 48 considers the body motion 86 first, then the wheel slip 88, and finally the standard stability 90. That is, the control hierarchy may further include, in certain configurations, that the order dictates that the controller 48 controls the body motion 86 of the vehicle 10 first, and if one or more of the wheels 26A, 26B of the vehicle 10 indicates an unstable behavior, then the controller 48 controls the wheel slip 88 of the vehicle 10, and then finally, if the body motion 86 and the wheels 26A, 26B do not behave as requested, then the controller 48 controls the standard stability 90 of the vehicle 10. As such, the controller 48 tries to satisfy the driver command 84 by controlling the body motion 86 first, and then tries to satisfy the driver command 84 by controlling the wheel slip 88 next, and finally tries to satisfy the driver command 84 by controlling the standard stability 90. By resorting to the standard stability 90 last, energy may be saved due to one or more of these vehicle systems 12, 16, 18, 50, 52, 54, 56, 58, 60 being implemented less or not at all. Therefore, for example, intervention from the TCS 56, the ABS 58, and the ESC 60 (examples of the standard stability 90 features) may be reduced by implementing these last, which may save energy.

In other configurations, the control hierarchy provides that the controller 48 considers the body motion 86 and the wheel slip 88 together, and then finally the standard stability 90. That is, the control hierarchy may further include, in certain configurations, that the order dictates that the controller 48 controls the body motion 86 and the wheel slip 88 together, and if the body motion 86 and one or more of the wheels 26A, 26B of the vehicle 10 do not behave as requested, then the controller 48 controls the standard stability 90 of the vehicle 10. By resorting to the standard stability 90 last, energy may be saved due to one or more of these vehicle systems 12, 16, 18, 50, 52, 54, 56, 58, 60 being implemented less or not at all. Therefore, for example, intervention from the TCS 56, the ABS 58, and the ESC 60 (examples of the standard stability 90 features) may be reduced by implementing these last, which may save energy.

A state 94 of one or more of the vehicle systems 12, 16, 18, 50, 52, 54, 56, 58, 60 is controlled based on the sent output command 92 as dictated via the control hierarchy. The vehicle systems 12, 16, 18, 50, 52, 54, 56, 58, 60 may include a plurality of actuators 42A, 42B, 44, 46, 62, 64, 66, 68, and the actuators 42A, 42B, 44, 46, 62, 64, 66, 68 may be used to control the body motion 86, the wheel slip 88, and the standard stability 90. Therefore, some of the actuators 42A, 42B, 44, 46, 62, 64, 66, 68 may be used to control one or more of the body motion 86, the wheel slip 88, and the standard stability 90. In certain configurations, the output command 92 is sent to at least one of the actuators 42A, 42B, 44, 46, 62, 64, 66, 68 of one or more of the vehicle systems 12, 16, 18, 50, 52, 54, 56, 58, 60 to control the body motion 86 of the vehicle 10 and the wheel slip 88 of the vehicle 10. Therefore, the state 94 of one or more of the actuators 42A, 42B, 44, 46, 62, 64, 66, 68 may be controlled based on the output command 92. An actuator interface 95 may optionally be included which unifies or standardizes communication between the actuators 42A, 42B, 44, 46, 62, 64, 66, 68 and the controls of the various systems.

Various actuators may be used, and non-limiting examples of some of the actuators 42A, 42B, 44, 46, 62, 64, 66, 68 are discussed above and below. In certain configurations, the actuators may include the electric motor 64, the clutch, such as the dual clutch 62, the eLSD 44, the active aerodynamic assembly 66, and the engine/axle torque actuator 68. Therefore, in certain configurations, the at least one of the electric motor 64, the clutch 62, the eLSD 44, the active aerodynamic assembly 66, and the engine/axle torque actuator 68 are selectively actuated to control the state 94. By selectively actuating the actuator(s) 42A, 42B, 44, 46, 62, 64, 66, 68 the stability and the handling of the vehicle 10 may be improved. For example, below are a few examples of some of the actuators 42A, 42B, 44, 46, 62, 64, 66, 68 and what may be controlled using those actuators 42A, 42B, 44, 46, 62, 64, 66, 68.

In certain configurations, the eLSD 44 is coupled to one of the front axle 24A and the rear axle 24B. Therefore, if utilizing the eLSD 44, the eLSD 44 is selectively actuated to control distribution of torque laterally of the respective front axle 24A and the respective rear axle 24B to control the wheel slip 88. Therefore, generally, the eLSD 44 may be used to control the wheel slip 88 of the vehicle 10. The eLSD 44 may also be used to control the body motion 86 of the vehicle 10.

In certain configurations, at least one of the actuators 42A, 42B is coupled to one of the front and rear axles 24A, 24B. The at least one of the actuators 42A, 42B that is coupled to one of the front axle 24A and the rear axle 24B is selectively actuated to control front-to-rear axle torque. Therefore, controlling front-to-rear axle torque generally relates to controlling the body motion 86 of the vehicle 10.

In combination with at least one of the actuators 42A, 42B, the eLSD 44 may be coupled to the other one of the front axle 24A and the rear axle 24B. The eLSD 44 is selectively actuated to control distribution of torque laterally of the respective front axle 24A and the respective rear axle 24B to control the wheel slip 88 (of one or more of the first and second sets of the wheels 26A, 26B of the vehicle 10).

In yet another configuration, one of the actuators 42A, 42B is coupled to the front axle 24A to control the axle torque of the front axle 24A, and another one of the actuators 42A, 42B is coupled to the rear axle 24B to control front-to-rear axle torque. The actuator 42A coupled to the front axle 24A is selectively actuated to control the state 94 and the actuator 42B coupled to the rear axle 24B is selective actuated to control the state 94. Furthermore, in this configuration, the eLSD 44 is coupled to one of the front axle 24A and the rear axle 24B. The eLSD 44 is selectively actuated to control distribution of torque laterally of the respective front axle 24A and the respective rear axle 24B to control the wheel slip 88.

Calculations may be used to control the body motion 86 and the wheel slip 88. This data is compiled and used in the control hierarchy discussed above. Therefore, in certain configurations, the calculations for the body motion 86 and the wheel slip 88 remain separate, and in other configurations, the calculations for the body motion 86 and wheel slip 88 are combined.

The controller 48 may use various calculations to control the body motion 86. The calculations may be used to minimize discrepancies between the desired and actual body motion 86 of the vehicle 10. For example, the controller 48 may use data (which may be, for example, sensory or estimated information) regarding the steering angle, a yaw rate, a lateral velocity of the vehicle 10, a lateral acceleration of the vehicle 10, a longitudinal speed or velocity of the vehicle 10, an angular velocity of the wheel 26A, 26B, a normal force, a longitudinal force, and torque delivered from one of the actuators 42A, 42B, etc. The controller 48 may calculate a target body motion based on a lateral velocity of the vehicle 10 at a center of gravity (CG) point 96, a yaw rate of the vehicle 10 at the CG point 96, and a total yaw moment of the vehicle 10 at the CG point 96. In certain configurations, the output command 92 is sent based on the target body motion to control the body motion 86 of the vehicle 10.

The target body motion may include a tire model 2002 that compiles information regarding one or more of the tires 28A, 28B of the vehicle 10. The tire model 2002 collects real-time data of the vehicle 10 in motion. Specifically, the tire model 2002 may provide information regarding slip of one or more of the tires 28A, 28B of the vehicle 10 as the vehicle 10 travels along the road 14. Therefore, lateral tire force may be obtained via the tire model 2002. The tire model 2002 may include equation (1):

$$F_{yi} = F_{zi}\mu_{yi} = F_{zi}\left(\frac{\rho_i}{\sqrt{v_{xi}^2\alpha_i^2 + \epsilon_i^2 s_i^2} + \gamma_i\rho_i} + \sigma_{2y}\right)v_{xi}\alpha_i \quad (1)$$

wherein:
$F_{yi}$=a force on the tires 28A, 28B on a y-axis (see FIG. 5);
$F_{zi}$=a force on the tires 28A, 28B on a z-axis (see FIG. 5);
$\mu_{yi}$=a normalize tire lateral force on the tires 28A, 28B;
$\rho_i$=a variable related to a tire transient function and road condition;
$\sigma_{2y}$=a relative viscous damping of the tire model 2002 on the y-axis;
$v_{xi}$=a velocity of the tires 28A, 28B on an x-axis;
$\alpha_i$=a side slip angle of the tires 28A, 28B;
$\epsilon_i$=a variable related to wheel slip 88;
$s_i$=a slip ratio of the tires 28A, 28B; and
$\gamma_i$=a variable related to the wheel slip 88 and tire rubber stiffness.

Figure 5:
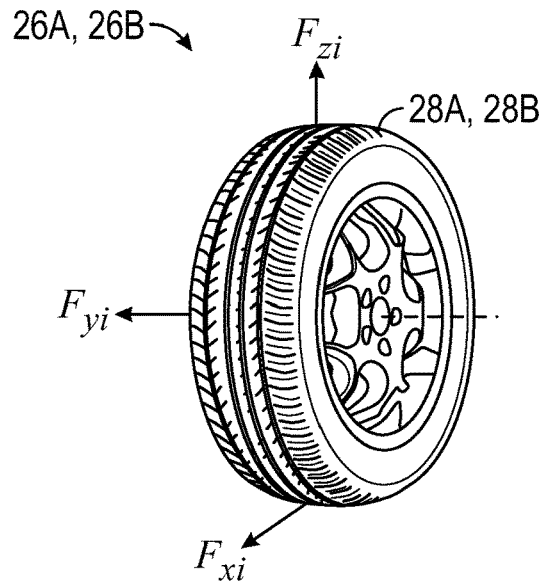
FIG. 5 is a schematic perspective view of a tire.

$F_{yi}$ and $F_{zi}$ are identified in FIG. 5. The tire model 2002 may include equation (1) to determine slip of one or more of the tires 28A, 28B. The derivative of $F_{yi}$ is obtained from equation (2):

$$\dot{F}_{yi} = F_{zi}\left(\frac{\partial\mu_{yi}}{\partial s_i}\dot{s}_i + \frac{\partial\mu_{yi}}{\partial\alpha_i}\dot{\alpha}_i\right) \quad (2)$$

wherein:
$F_{yi}$, $F_{zi}$, $\mu_{yi}$, $\alpha_i$ and $s_i$ are defined above; and
$\partial$=partial derivative.
$\dot{F}_{yi}$ is associated or connected with the torque of the engine 16, and $\dot{F}_{yi}$ of equation (2) may be re-written as equation (3):

$$\dot{F}_{yi} = \underbrace{\frac{F_{zi}(1 \mp s_i)}{w_i}\frac{\partial\mu_{yi}}{\partial s_i}}_{\nabla F_{s_i}}\dot{w}_i + \underbrace{\frac{F_{zi}}{v_x}\frac{\partial\mu_{yi}}{\partial\alpha_i}}_{\nabla F_{\alpha_i}}\dot{\alpha}_i v_x \quad (3)$$

wherein:
$F_{yi}$, $F_{zi}$, $\alpha_i$, $\partial$, $\mu_{yi}$ and $s_i$ are defined above;
$v_x$=a longitudinal velocity of the vehicle 10 at the CG point 96;
$w_i$=a rotational speed of each of the tires 28A, 28B;
$\nabla F_{s_i}$=a coefficient of a partial derivative with respect to a slip ratio of the tires 28A, 28B; and
$\nabla F_{\alpha_i}$=a coefficient of a partial derivative with respect to side slip angles of the tires 28A, 28B.

Using equation (3), $\dot{F}_y$ is obtained in the matrix form from equation (4):

$$\dot{F}_y = \underbrace{\begin{bmatrix} -\nabla F_{\alpha_1} & -l_f\nabla F_{\alpha_1} & 0 \\ -\nabla F_{\alpha_2} & -l_f\nabla F_{\alpha_2} & 0 \\ -\nabla F_{\alpha_3} & l_r\nabla F_{\alpha_3} & 0 \\ -\nabla F_{\alpha_4} & l_r\nabla F_{\alpha_4} & 0 \end{bmatrix}}_{A_2}\begin{bmatrix} \dot{v}_y \\ \dot{r} \\ \dot{M}_{zCG} \end{bmatrix} + \quad (4)$$

$$\underbrace{\begin{bmatrix} \nabla F_{s_1}/2I_w & 0 & 0 \\ \nabla F_{s_2}/2I_w & 0 & 0 \\ 0 & \nabla F_{s_3}/2I_w & \nabla F_{s_3}/2I_w \\ 0 & \nabla F_{s_4}/2I_w & -\nabla F_{s_4}/2I_w \end{bmatrix}}_{B_2} \begin{bmatrix} \Delta T_f \\ \Delta T_r \\ \Delta T_c \end{bmatrix} +$$

$$\underbrace{\begin{bmatrix} \dfrac{\nabla F_{s_1}}{2I_w} & 0 & 0 & 0 \\ 0 & \dfrac{\nabla F_{s_2}}{2I_w} & 0 & 0 \\ 0 & 0 & \dfrac{\nabla F_{s_3}}{2I_w} & 0 \\ 0 & 0 & 0 & \dfrac{\nabla F_{s_4}}{2I_w} \end{bmatrix}}_{G_2} \underbrace{\begin{bmatrix} T_{d,f} - 2R_w F_{x1} \\ T_{d,f} - 2R_w F_{x2} \\ T_{d,r} + T_c - 2R_w F_{x3} \\ T_{d,r} - T_c - 2R_w F_{x4} \end{bmatrix}}_{d_2}$$

wherein:
$F_y$=a lateral tire force on each of the tires 28A, 28B;
$l_f$=a length between the front axle 24A and the CG point 96 of vehicle 10 (see FIG. 6);
$l_r$=a length between the rear axle 24B and the CG point 96 of vehicle 10 (see FIG. 6);
$\nabla F_{\alpha_1}$=a coefficient of a partial derivative with respect to a side slip angle of a left-hand front tire 28A;
$\nabla F_{\alpha_2}$=a coefficient of a partial derivative with respect to a side slip angle of a right-hand front tire 28A;
$\nabla F_{\alpha_3}$=a coefficient of a partial derivative with respect to a side slip angle of a left-hand rear tire 28B;
$\nabla F_{\alpha_4}$=a coefficient of a partial derivative with respect to a side slip angle of a right-hand rear tire 28B;
$F_{s_1}$=a coefficient of a partial derivative with respect to a slip ratio of a left-hand front tire 28A;
$F_{s_2}$=a coefficient of a partial derivative with respect to a slip ratio of a right-hand front tire 28A;
$F_{s_3}$=a coefficient of a partial derivative with respect to a slip ratio of a left-hand rear tire 28B;
$F_{s_4}$=a coefficient of a partial derivative with respect to a slip ratio of a right-hand rear tire 28B;
$I_w$=a wheel mass moment of rolling inertia of the tires 28A, 28B;
$T_{d,f}$=the torque 23A input of the front axle 24A due to the input data 50;
$T_{d,r}$=the torque 23B input of the rear axle 24B due to the input data 50;
$T_c$=the torque of the clutch 46 of the eLSD 44;
$R_w$=a wheel effective rolling radius;
$F_{x1}$=a force along a x-axis of one of the front tires 28A (see FIG. 6);
$F_{x2}$=a force along a x-axis of another one of the front tires 28A (see FIG. 6);
$F_{x3}$=a force along a x-axis of one of the rear tires 28B (see FIG. 6);
$F_{x4}$=a force along a x-axis of one of the rear tires 28B (see FIG. 6);
$v_y$=a lateral velocity of the vehicle 10 at the CG point 96;
$r$=a yaw rate of the vehicle 10 at the CG point 96;
a total yaw moment of the vehicle 10 at the CG point 96;
$\Delta T_f$=an adjustment of the front axle torque 23A;
$\Delta T_r$=an adjustment of the rear axle torque 23B; and
$\Delta T_c$=an adjustment of a clutch 46 of the eLSD 44.

Equation (4) identifies $A_2$, $B_2$, $u$, $G_2$, and $d_2$ by bracketing the respective portions of the equation that these symbols represent. Therefore, the matrix form of $\dot{F}_y$ from equation (4) may be reduced to equation (5):

$$\dot{F}_y = A_2 \dot{x} + B_2 u + G_2 d_2 \qquad (5)$$

wherein:

$$\dot{x} = \begin{bmatrix} \dot{v}_y \\ \dot{r} \\ \dot{M}_{z_{CG}} \end{bmatrix}$$

$v_y$, $r$ and $M_{z_{CG}}$ are defined above.

Equation (5) is inserted into another equation to obtain equations (6) and (7), which will be further discussed below. Various vehicle states, which includes the behavior of the tires 28A, 28B from the tire model 2002 is modeled with enough detail to include the effects of the axle torque 23A, 23B and slip conditions. Therefore, the target body motion may be calculated whether adjustments of the axle torque 23A, 23B are necessary using equations (6) and (7):

$$\dot{x} = \overline{A}_c x + \overline{B}_c u + \overline{d}_c \qquad (6)$$

$$y = C_c x \qquad (7)$$

wherein:
$x = [v_y \; r \; M_{z_{CG}}]^T$;
$y = [v_y \; r]^T$;
$u = [\Delta T_f \; \Delta T_r \; \Delta T_c]^T$;
$v_y$, $r$ and $M_{z_{CG}}$ are defined above;
$\Delta T_f$, $\Delta T_r$, and $\Delta T_c$ are defined above;
T=a weight matrix emphasizing torque shifting issues;
$\overline{A}_c$=a system matrix of time-varying;
$\overline{B}_c$=an input matrix of time-varying;
$\overline{d}_c$=a disturbance term that includes the input data 50; and
$C_c$=an output matrix.

Figure 6:
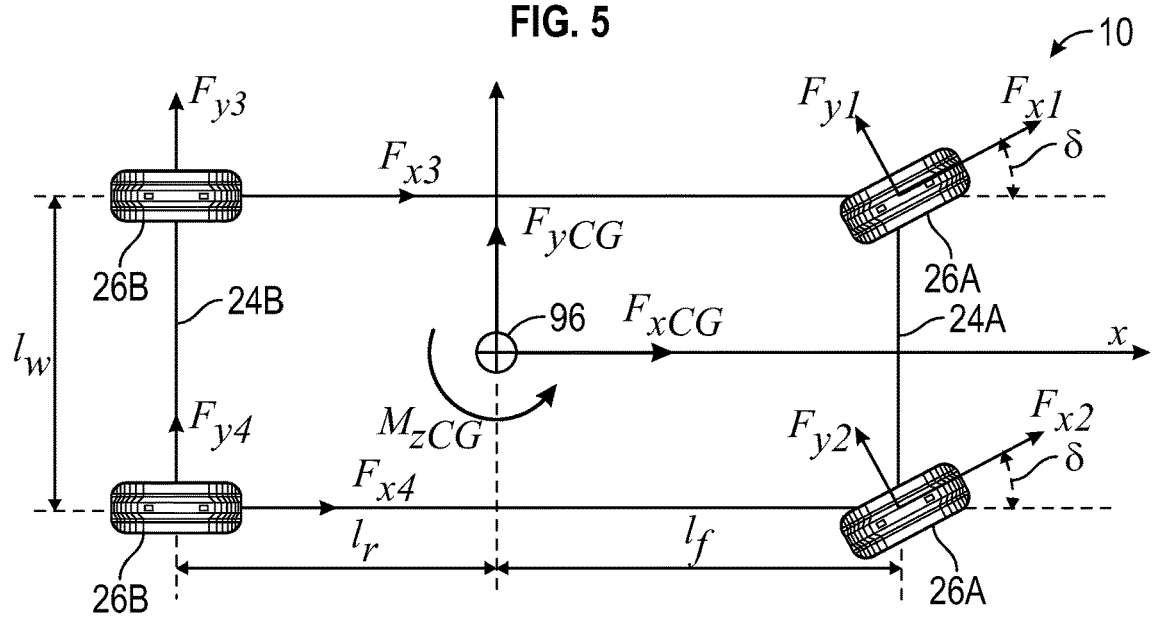
FIG. 6 is a schematic illustration of the vehicle identifying various forces, moments, steering angles, etc.

Also see FIGS. 4 and 6 which include some of the symbols identified immediately above for equations (6) and (7). Furthermore, the target body motion uses various states of the vehicle 10, via equation (8):

$$x = [v_y r M_{z_{CG}}]^T \qquad (8)$$

wherein:
$M_{z_{CG}}$ is defined above as a total yaw moment of the vehicle 10 at the CG point 96, and is also representative by equation:
$M_{z_{CG}} = -l_w(F_{x3} - F_{x4})/2 + l_f(F_{x1} \sin \delta + F_{y1} \cos \delta + F_{x2} \sin \delta + F_{y2} \cos \delta) - l_r(F_{y3} + F_{y4})$;
$l_f$, $l_r$, $F_{x1}$, $F_{x2}$, $F_{x3}$, $F_{x4}$, T, $v_y$ and $r$ are defined above;
$l_w$=a length between respective tires 28A, 28B (see FIG. 6);
$F_{y1}$=a force along a y-axis of one of the front tires 28A (see FIG. 6);
$F_{y2}$=a force along a y-axis of another one of the front tires 28A (see FIG. 6);
$F_{y3}$=a force along a y-axis of one of the rear tires 28B (see FIG. 6);
$F_{y4}$=a force along a y-axis of one of the rear tires 28B (see FIG. 6); and
$\delta$=the steering angle (see FIG. 6).

The derivative of equation $M_{z_{CG}}$ identified above is obtained from equation (9):

$$\dot{M}_{z_{CG}} = -l_w(\dot{F}_{x3} - \dot{F}_{x4})/2 + l_f(\dot{F}_{y1} \cos \delta + \dot{F}_{y2} \cos \delta) - l_r(\dot{F}_{y3} + \dot{F}_{y4}) \qquad (9)$$

wherein:
$l_f$, $l_r$, $l_w$, $F_{x3}$, $F_{x4}$, $F_{y1}$, $F_{ye}$, $F_{y3}$, $F_{y4}$ and $\delta$ are defined above.

Lateral tire forces contribute to the lateral body dynamics of the vehicle 10, and the lateral tire forces are affected by longitudinal tire force distribution. Therefore, various vehicle states, which includes the lateral tire forces are modeled via equation (10):

$$\begin{bmatrix} \dot{v}_y \\ \dot{r} \\ \dot{M}_{zCG} \end{bmatrix} = \underbrace{\begin{bmatrix} 0 & -v_x & 0 \\ 0 & 0 & 1/I_{ZZ} \\ 0 & 0 & 0 \end{bmatrix}}_{A_1} \begin{bmatrix} v_y \\ r \\ M_{zCG} \end{bmatrix} + \underbrace{\begin{bmatrix} 0 & 0 & 0 \\ 0 & 0 & 0 \\ 0 & 0 & -l_w/2\tau R_w \end{bmatrix}}_{B_1} \underbrace{\begin{bmatrix} \Delta T_f \\ \Delta T_r \\ \Delta T_c \end{bmatrix}}_{u} + \tag{10}$$

$$\underbrace{\begin{bmatrix} 0 & 0 & 0 & 0 \\ 0 & 0 & 0 & 0 \\ l_f\cos\delta & l_f\cos\delta & -l_r & -l_r \end{bmatrix}}_{C_1} \dot{F}_y + \underbrace{\begin{bmatrix} a_y \\ 0 \\ l_w(F_{x3}-F_{x4})/2\tau - l_wT_c/2\tau R_w \end{bmatrix}}_{d_1}$$

wherein:
$l_f$, $l_r$, $l_w$, $\dot{F}_y$, $F_{x3}$, $F_{x4}$, $\delta$, $R_w$, $T_c$, $v_x$, $v_y$, r, $M_{zCG}$, $\Delta T_f$, $\Delta T_r$, and $\Delta T_c$ are defined above.
$I_{zz}$=an inertial of yaw moment of the vehicle 10;
$a_y$=a measured lateral acceleration of the vehicle 10; and
τ=a time constant of the eLSD 44.

Various vehicle states, which include the lateral tire forces of equation (10) is used via the target body motion to obtain equations (6) and (7). Equation (10) identifies $A_1$, $B_1$, u, $C_1$, and $d_1$ by bracketing the respective portions of the equation that these symbols represent. Therefore, the matrix form of equation (10) is reduced to equation (11):

$$\dot{x}=A_1x+B_1u+C_1\dot{F}_y+d_1 \tag{11}$$

wherein:

$$x = \begin{bmatrix} v_y \\ r \\ M_{zCG} \end{bmatrix}$$

$v_y$, r and $M_{zCG}$ are defined above.

Equation (5) is inserted into equation (11) to obtain equations (6) and (7). Therefore, the target body motion uses equations (6) and (7) to determine the vehicle's state during real-time travel of the vehicle 10, and thus, to determine whether adjustments of torque 23A, 23B of the front and/or rear axle 24A, 24B are needed to enhance the stability and handling of the vehicle 10 as the vehicle 10 travels along the road 14.

The controller 48 may use various calculations to control the wheel slip 88. The calculations may be used to minimize discrepancies between the desired and actual wheel dynamics of the vehicle 10. For example, the controller 48 may use data (which may be, for example, sensory or estimated information) regarding the lateral velocity of the vehicle 10, the longitudinal speed or velocity of the vehicle 10, the angular velocity of the wheel 26A, 26B, a wheel slip ratio (which is the difference between a rotational speed of the wheel 26A, 26B and a center speed or velocity of the wheel 26A, 26B), the longitudinal force, and the torque delivered from one of the actuators 42A, 42B, etc. The controller 48 may calculate a target wheel motion based on a moment of inertia of the wheel 26A, 26B, a driving torque of the wheel 26A, 26B, and a braking torque of the wheel 26A, 26B. In certain configurations, the output command 92 is sent based on the target wheel motion to control the wheel slip 88 (of one or more of the first and second sets of the wheels 26A, 26B) of the vehicle 10.

Figure 7:
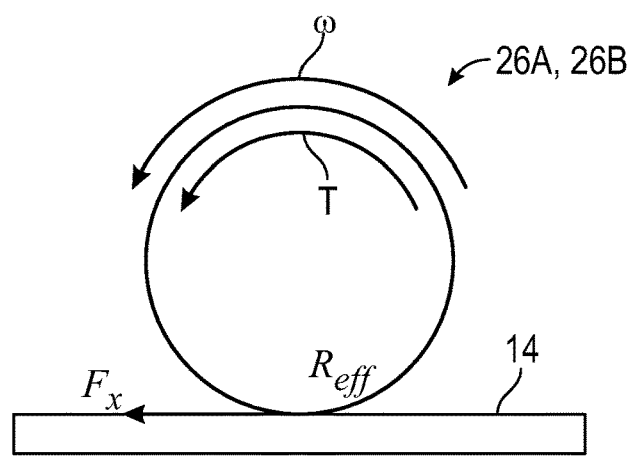
FIG. 7 is a schematic illustration of a wheel relative to the road.

The target wheel motion may include a wheel model 2004 that compiles information regarding each of the wheels 26A, 26B and corresponding tires 28A, 28B of the vehicle 10. The wheel model 2004 collects real-time data of the vehicle 10 in motion. Specifically, the wheel model 2004 may provide information regarding wheel dynamics such as slip of the wheels 26A, 26B and corresponding tires 28A, 28B of the vehicle 10 as the vehicle 10 travels along the road 14. Therefore, the wheel model 2004 considers the effect of the actuators 42A, 42B, 44, 46, 62, 64, 66, 68 on each of the corners of the vehicle 10, i.e., each of the wheels 26A, 26B. The wheel model 2004 may include equations (12)-(15), and also see FIG. 7, which is a generalization that may represent any of the wheels 26A, 26B:

$$I_\omega\dot{\omega}_1=(T_{d,f}+\Delta T_f)/2-T_{b1}-R_{\text{eff}}F_{x1} \tag{12}$$

wherein:
$I_\omega$=moment of inertia;
$\omega_1$=rotational speed of the front-left wheel 26A;
$T_{d,f}$=driving torque of the front-left wheel 26A;
$\Delta T_f$=change in torque request of the front-left wheel 26A;
$T_{b1}$=braking torque of the front-left wheel 26A;
$R_{\text{eff}}$=effective tire radius of the tire 28A of the front-left wheel 26A; and
$F_{x1}$=force between the tire 28A of the front-left wheel 26A and the road 14.

$$I_\omega\dot{\omega}_2=(T_{d,f}+\Delta T_f)/2-T_{b2}-R_{\text{eff}}F_{x2} \tag{13}$$

wherein:
$I_\omega$ is defined above.
$\omega_2$=rotational speed of the front-right wheel 26A;
$T_{d,f}$=driving torque of the front-right wheel 26A;
$\Delta T_f$=change in torque request of the front-right wheel 26A;
$T_{b2}$=braking torque of the front-right wheel 26A;
$R_{\text{eff}}$=effective tire radius of the tire 28A of the front-right wheel 26A;
and
$F_{x2}$ force between the tire 28A of the front-right wheel 26A and the road 14.

$$I_\omega\dot{\omega}_3=(T_{d,r}+\Delta T_r)/2-T_{b3}-R_{\text{eff}}F_{x3} \tag{14}$$

wherein:
$I_\omega$ is defined above.
$\omega_3$=rotational speed of the rear-left wheel 26B;
$T_{d,r}$=driving torque of the rear-left wheel 26B;
$\Delta T_r$=change in torque request of the rear-left wheel 26B;
$T_c$=torque of the clutch 46 of the eLSD 44;
$\Delta T_c$=change in torque of the clutch 46 of the eLSD 44;
$T_{b3}$=braking torque of the rear-left wheel 26B;
$R_{\text{eff}}$=effective tire radius of the tire 28B of the rear-left wheel 26B; and
$F_{x3}$=force between the tire 28B of the rear-left wheel 26B and the road 14.

$$I_\omega\dot{\omega}_4=(T_{d,r}+\Delta T_r)/2-T_{b4}-R_{\text{eff}}F_{x4} \tag{15}$$

wherein:
$I_\omega$ is defined above.
$\omega_4$=rotational speed of the rear-right wheel 26B;
$T_{d,r}$=driving torque of the rear-right wheel 26B;
$\Delta T_r$=change in torque request of the rear-right wheel 26B;
$T_{b4}$=braking torque of the rear-right wheel 26B;
$R_{\text{eff}}$=effective tire radius of the tire 28B of the rear-right wheel 26B; and
$F_{x4}$=force between the tire 28B of the rear-right wheel 26B and the road 14.

The above calculations of the body motion 86 and the wheel slip 88 may be used in the predictive model 2000, and the predictive model 2000 may include a cost function model 2006 that may predict future characteristics of the vehicle 10 for a defined time horizon to give a future preview of optimal control of the vehicle 10.

The cost function model 2006 may predict future characteristics of the vehicle 10, such as tracking issues which may include the yaw rate (r) of the vehicle 10 at a CG point 96 and the lateral velocity ($v_y$) of the vehicle 10, as well as control efforts, such as the torque 23A control of the front axle 24A and the torque 23B control of the rear axle 24B, and as well as wheel dynamic issues.

The cost function model 2006 may also predict future characteristics of the driver's torque request ($\Delta T_f(k) + \Delta T_r(k)$), which for example, balances the overall driver torque request by ensuring that if torque is removed from the rear axle 24B, the amount of torque removed from the rear is added to the front axle 24A, and vice versa. The cost function model 2006 may also predict future characteristics of the amount of braking 54 requested and the amount of acceleration 56 requested. By predicting various characteristics of the vehicle 10 via the cost function model 2006, an optimal solution may be found for the axle torque distribution, and thus, position the vehicle 10 along the curve 32 as desired, thus minimizing oversteering and understeering.

Generally, the cost function model 2006 changes the problem in real-time from a control problem to an optimization problem. The cost function model 2006 provides various control objectives and enough detail regarding future characteristics of the vehicle 10 to tune the controller 48 in order to provide the optimal body dynamics and the optimal wheel dynamics. The cost function model 2006 may include equation (16):

$$U^* = \operatorname{argmin}: J(x(t), U_t) = \Sigma_{k=1}^{N_p} \|y_{t+k,t} - y_{dt+k,t}\|_Q^2 + \Sigma_{k=1}^{N_p-1} \|u_{t+k,t}\|_R^2 + \Sigma_{k=1}^{N_p-1} \|e_{t+k,t}\|_T^2 \quad (16)$$

wherein:
$U^*$ = a sequence of optimal future control actions;
J = a defined cost function for a formulation of a control problem to an optimization problem;
x(t) = a current state of x, where x is defined above as $[v_y \; r \; M_{z_{CG}}]^T$;
$U_t$ = a defined total sequence or vector of control inputs that includes the axle torque ($T_f$) 23A of the front axle 24A, the axle torque ($T_r$) 23B of the rear axle 24B and the torque ($T_c$) of the clutch 46 of the eLSD 44;
$N_p$ = a number of prediction horizon (in other words, how far in the future is the prediction);
k = the $k^{th}$ step in the defined horizon $N_p$;
y = see the below discussion regarding the different applications of y;
$y_{t+k,t}$ = the $k^{th}$ predicted actual output of equations (6) and (7);
$y_{dt+k,t}$ = the $k^{th}$ desired output from the tire model 2002 and the wheel model 2004;
Q = a weight matrix emphasizing tracking issues;
$U_{t+k,t}$ = the $k^{th}$ predicted control input of equations (6) and (7);
R = a weight matrix emphasizing control efforts;
$e_{t+k,t}$ = a summation of the adjustments of the torque 23A, 23B of the front and rear axles 24A, 24B; and
T = a weight matrix emphasizing torque shifting issues.

The variable y, as presented in the above equation (16) may be applied differently depending on whether the body motion 86 and the wheel slip 88 are to be considered together or separately in the control hierarchy. Each of the scenarios are discussed below.

As mentioned above, the control hierarchy may control the body motion 86 and the wheel slip 88 together, and if the driver command 84 is not satisfied after controlling the body motion 86 and the wheel slip 88 together, then the controller 48 controls the standard stability 90 of the vehicle 10. When the body motion 86 and the wheel slip 88 are considered together, the variable y uses the following equation (17):

$$y = \{vr M_{z_{CG}} \omega_1 \omega_2 \omega_3 \omega_4\}^T \quad (17)$$

wherein:
$v_y$, r $M_{z_{CG}}$, $\omega_1$, $\omega_2$, $\omega_3$, $\omega_4$, and T are defined above.

Therefore, in equation (17), the body dynamics and the wheel dynamics are combined together to determine the final control action in equation (16) for the stability and handling of the vehicle 10.

As mentioned above, the control hierarchy may control the body motion 86 first, then the wheel slip 88, and finally the standard stability 90. Therefore, the body dynamics and the wheel dynamics are considered separately. After controlling the body dynamics and wheel dynamics separately, then if the driver's request is not satisfied, the controller 48 will determine whether the standard stability 90 features should be implemented.

When the body motion 86 and the wheel slip 88 are considered separately, the variable y has two separate equations that are independently inserted into equation (16). Therefore, in this configuration, there will be two separate control commands, with one command for the body dynamics and another command for the wheel dynamics. For the body dynamics, equation (18) is inserted into equation (16) to determine the optimal body dynamics:

$$y = \{vr M_{z_{CG}}\}^T, \quad (18)$$

wherein:
$v_y$, r, $M_{z_{CG}}$, and T are defined above.

For the wheel dynamics, equation (19) is inserted into equation (16) to determine the optimal wheel dynamics:

$$y = \{\omega_1 \omega_2 \omega_3 \omega_4\}^T$$

$\omega_1$, $\omega_2$, $\omega_3$, $\omega_4$, and T are defined above.

The predictive model 2000 may also include a dynamic model 2008 that provides real-time optimization of the body dynamics and the wheel dynamics of the vehicle 10. The dynamic model 2008 is configured to determine the optimal future control sequence of the body dynamics and the wheel dynamics while minimizing the cost via the cost function model 2006. Optimization may be provided via quadratic programming. A quadratic programming problem may be solved in real-time at every time step to find the control action having the lowest cost by using the quadratic programming. By predicting into the future, the controller 48 is able to consider the effects of the body dynamics before such body dynamics occur, and wheel dynamics before such wheel dynamics occur.

While the best modes and other configurations for carrying out the disclosure have been described in detail, those familiar with the art to which this disclosure relates will recognize various alternative designs and configurations for practicing the disclosure within the scope of the appended claims. Furthermore, the configurations shown in the drawings or the characteristics of various configurations mentioned in the present description are not necessarily to be understood as configurations independent of each other. Rather, it is possible that each of the characteristics described in one of the examples of a configuration can be combined with one or a plurality of other desired characteristics from other configurations, resulting in other configurations not described in words or by reference to the drawings. Accordingly, such other configurations fall within the framework of the scope of the appended claims.

What is claimed is:

1. A method of controlling stability of a vehicle, the method comprising:
   collecting, via a controller, driver input data;
   determining a driver command based on the driver input data;
   sending, via the controller, at least one output command to one or more vehicle systems to control stability of the vehicle based on the driver command;
   wherein the controller sends the output command based on a control hierarchy that provides an order in which the controller controls body motion of the vehicle, wheel slip of the vehicle, and standard stability of the vehicle to control stability of the vehicle;
   wherein the order dictates that the controller controls the body motion of the vehicle and the wheel slip of the vehicle before the controller controls the standard stability of the vehicle;
   controlling a state of one or more of the vehicle systems based on the sent output command as dictated via the control hierarchy; and
   wherein the control hierarchy further includes that the order dictates that the controller controls the body motion of the vehicle first, and if one or more wheels of the vehicle indicates an unstable behavior, then the controller controls the wheel slip of the vehicle, and then if the body motion and the wheels do not behave as requested, then the controller controls the standard stability of the vehicle.

2. A method of controlling stability of a vehicle, the method comprising:
   collecting, via a controller, driver input data;
   determining a driver command based on the driver input data;
   sending, via the controller, at least one output command to one or more vehicle systems to control stability of the vehicle based on the driver command;
   wherein the controller sends the output command based on a control hierarchy that provides an order in which the controller controls body motion of the vehicle, wheel slip of the vehicle, and standard stability of the vehicle to control stability of the vehicle;
   wherein the order dictates that the controller controls the body motion of the vehicle and the wheel slip of the vehicle before the controller controls the standard stability of the vehicle;
   controlling a state of one or more of the vehicle systems based on the sent output command as dictated via the control hierarchy; and
   wherein the control hierarchy further includes that the order dictates that the controller controls the body motion and the wheel slip together, and if the body motion and one or more wheels of the vehicle do not behave as requested, then the controller controls the standard stability of the vehicle.

3. The method as set forth in claim 1 wherein the vehicle systems include a plurality of actuators, and wherein sending the output command includes sending the output command to at least one of the actuators of one or more of the vehicle systems to control the body motion of the vehicle and the wheel slip of the vehicle.

4. The method as set forth in claim 3 wherein controlling the state includes controlling the state of one or more of the actuators based on the output command.

5. The method as set forth in claim 4 wherein the actuators include an electric motor, a clutch, an electronic limited slip differential (eLSD), an active aerodynamic assembly, and an engine/axle torque actuator, and wherein controlling the state further includes selectively actuating the at least one of the electric motor, the clutch, the eLSD, the active aerodynamic assembly, and the engine/axle torque actuator.

6. The method as set forth in claim 5 further including a front axle and a rear axle spaced from each other, and wherein controlling the state further includes selectively actuating the eLSD to control distribution of torque laterally of the respective front axle and the respective rear axle to control the wheel slip.

7. The method as set forth in claim 3 further including a front axle and a rear axle spaced from each other, and at least one of the actuators is coupled to one of the front and rear axles, and wherein controlling the state further includes selectively actuating the at least one of the actuators that is coupled to one of the front axle and the rear axle to control front-to-rear axle torque.

8. The method as set forth in claim 7 wherein the actuators include an electronic limited slip differential (eLSD) that is coupled to the other one of the front axle and the rear axle, and wherein controlling the state further includes selectively actuating the eLSD to control distribution of torque laterally of the respective front axle and the respective rear axle to control the wheel slip.

9. The method as set forth in claim 7 wherein one of the actuators is coupled to the front axle to control axle torque of the front axle, and another one of the actuators is coupled to the rear axle to control the front-to-rear axle torque, and wherein controlling the state further includes selectively actuating the actuator coupled to the front axle and selectively actuating the actuator coupled to the rear axle.

10. The method as set forth in claim 9 wherein the actuators include an electronic limited slip differential (eLSD) that is coupled to one of the front axle and the rear axle, and wherein controlling the state further includes selectively actuating the eLSD to control distribution of torque laterally of the respective front axle and the respective rear axle to control the wheel slip.

11. The method as set forth in claim 1 wherein the driver input data includes an amount of acceleration of the vehicle via an accelerator, a steering angle of the vehicle via a steering input, a speed of the vehicle along a longitudinal axis, and an amount of braking of the vehicle via a brake, and wherein determining the driver command includes determining the driver command based on the amount of acceleration, the steering angle, the speed of the vehicle, and the amount of braking.

12. The method as set forth in claim 1 wherein the vehicle systems include a traction control system, an anti-lock brake system, and an electronic stability control system which are the vehicle systems controlled in the standard stability of the vehicle.

13. A method of controlling stability of a vehicle, the method comprising:
   collecting, via a controller, driver input data;
   determining a driver command based on the driver input data;
   sending, via the controller, at least one output command to one or more vehicle systems to control stability of the vehicle based on the driver command;
   wherein the controller sends the output command based on a control hierarchy that provides an order in which the controller controls body motion of the vehicle, wheel slip of the vehicle, and standard stability of the vehicle to control stability of the vehicle;

wherein the order dictates that the controller controls the body motion of the vehicle and the wheel slip of the vehicle before the controller controls the standard stability of the vehicle;

controlling a state of one or more of the vehicle systems based on the sent output command as dictated via the control hierarchy; and calculating, via the controller, a target body motion based on a lateral velocity of the vehicle at a center of gravity point, a yaw rate of the vehicle at the center of gravity point, and a total yaw moment of the vehicle at the center of gravity point, and wherein sending the output command further includes sending the output command based on the target body motion to control the body motion of the vehicle.

14. The method as set forth in claim 1 further including calculating, via the controller, a target wheel motion based on a moment of inertia of a wheel, a driving torque of the wheel, and a braking torque of the wheel, and wherein sending the output command further includes sending the output command based on the target wheel motion to control the wheel slip of the vehicle.

15. The method as set forth in claim 1:

wherein the driver input data includes an amount of acceleration of the vehicle via an accelerator, a steering angle of the vehicle via a steering input, a speed of the vehicle along a longitudinal axis, and an amount of braking of the vehicle via a brake, and wherein determining the driver command includes determining the driver command based on the amount of acceleration, the steering angle, the speed of the vehicle, and the amount of braking;

wherein the vehicle systems include a traction control system, an anti-lock brake system, and an electronic stability control system which are the vehicle systems controlled in the standard stability of the vehicle;

further including calculating, via the controller, a target body motion based on a lateral velocity of the vehicle at a center of gravity point, a yaw rate of the vehicle at the center of gravity point, and a total yaw moment of the vehicle at the center of gravity point, and wherein sending the output command further includes sending the output command based on the target body motion to control the body motion of the vehicle; and further including calculating, via the controller, a target wheel motion based on a moment of inertia of a wheel, a driving torque of the wheel, and a braking torque of the wheel, and wherein sending the output command further includes sending the output command based on the target wheel motion to control the wheel slip of the vehicle.

16. A stability control system for a vehicle, the stability control system comprising:

a front axle;

a rear axle spaced from the front axle;

a first set of wheels coupled to the front axle;

a second set of wheels coupled to the rear axle;

a controller including a processor configured to execute instructions from a memory, and wherein the controller is configured to:

collect driver input data;

determine a driver command based on the driver input data;

send at least one output command to one or more vehicle systems to control stability of the vehicle based on the driver command;

wherein the controller sends the output command based on a control hierarchy that provides an order in which the controller controls body motion of the vehicle, wheel slip of one or more of the first and second sets of the wheels of the vehicle, and standard stability of the vehicle to control stability of the vehicle;

wherein the order dictates that the controller controls the body motion of the vehicle and the wheel slip of the vehicle before the controller controls the standard stability of the vehicle;

control a state of one or more of the vehicle systems based on the sent output command as dictated via the control hierarchy; and wherein the control hierarchy further includes that the order dictates that the controller controls the body motion of the vehicle first, and if one or more wheels of the vehicle indicates an unstable behavior, then the controller controls the wheel slip of the vehicle, and then if the body motion and the wheels do not behave as requested, then the controller controls the standard stability of the vehicle.

17. The system as set forth in claim 16 wherein:

the vehicle systems include a plurality of actuators, and at least one of the actuators is coupled to one of the front and rear axles, and wherein the controller is configured to control the state via selectively actuating at least one of the actuators that is coupled to one of the front axle and the rear axle to control front-to-rear axle torque;

the driver input data includes an amount of acceleration of the vehicle via an accelerator, a steering angle of the vehicle via a steering input, a speed of the vehicle along a longitudinal axis, and an amount of braking of the vehicle via a brake, and wherein the controller is configured to determine the driver command includes determining the driver command based on the amount of acceleration, the steering angle, the speed of the vehicle, and the amount of braking; and the vehicle systems include a traction control system, an anti-lock brake system, and an electronic stability control system which are the vehicle systems controlled in the standard stability of the vehicle.

18. The method as set forth in claim 2 further including calculating, via the controller, a target wheel motion based on a moment of inertia of a wheel, a driving torque of the wheel, and a braking torque of the wheel, and wherein sending the output command further includes sending the output command based on the target wheel motion to control the wheel slip of the vehicle.

19. The method as set forth in claim 13 wherein the control hierarchy further includes that the order dictates that the controller controls the body motion of the vehicle first, and if one or more wheels of the vehicle indicates an unstable behavior, then the controller controls the wheel slip of the vehicle, and then if the body motion and the wheels do not behave as requested, then the controller controls the standard stability of the vehicle.

20. The method as set forth in claim 13 wherein the control hierarchy further includes that the order dictates that the controller controls the body motion and the wheel slip together, and if the body motion and one or more wheels of the vehicle do not behave as requested, then the controller controls the standard stability of the vehicle.

* * * * *